United States Patent [19]
Cherpician

[11] Patent Number: 5,551,919
[45] Date of Patent: Sep. 3, 1996

[54] STEERING COLUMN ASSEMBLY

[75] Inventor: Berci Cherpician, Farmington, Conn.

[73] Assignee: The Torrington Company, Torrington, Conn.

[21] Appl. No.: 156,324

[22] Filed: Nov. 23, 1993

Related U.S. Application Data

[63] Continuation of Ser. No. 843,321, Feb. 28, 1992, abandoned, and a continuation of Ser. No. 843,792, Feb. 26, 1992, abandoned.

[51] Int. Cl.$^6$ ..................................... F16D 3/52
[52] U.S. Cl. ............................ 464/92; 464/95; 464/182; 464/117
[58] Field of Search ............................ 464/92, 95, 93, 464/94, 182, 117

[56] References Cited

U.S. PATENT DOCUMENTS

| | | | |
|---|---|---|---|
| 279,415 | 6/1883 | Miller | 464/119 |
| 1,338,849 | 5/1920 | Adair | 464/117 |
| 1,411,468 | 4/1922 | Wood | 464/119 |
| 1,422,638 | 7/1922 | Ungar | 464/95 |
| 1,558,763 | 10/1925 | Rossberg . | |
| 2,214,293 | 9/1940 | D'Aubarede . | |
| 2,226,656 | 12/1940 | Best | 464/92 |
| 2,360,149 | 10/1944 | Moser | 464/92 |
| 2,453,012 | 11/1948 | Hickman . | |
| 2,913,884 | 11/1959 | Pfeifer | 464/92 |
| 3,296,827 | 1/1967 | Landon et al. | 464/92 |
| 3,407,629 | 10/1968 | Marchand | 464/92 |
| 3,600,969 | 8/1971 | Pitner | 74/492 |
| 3,752,007 | 8/1973 | Blondeleau et al. | 74/492 |
| 3,926,069 | 12/1975 | Wenninger | 74/492 |
| 4,121,532 | 10/1978 | Coryell, III | 115/34 R |
| 4,802,881 | 2/1989 | Hancock | 474/93 |

FOREIGN PATENT DOCUMENTS

| | | |
|---|---|---|
| 2515129 | 4/1983 | France . |
| 2526751 | 11/1983 | France . |

OTHER PUBLICATIONS

"Noise–Reducing Coupling", IBM Technical Disclosure Bulletin, vol. 24 No. 1A Jun. 1981.

*Primary Examiner*—C. D. Crowder
*Assistant Examiner*—Bibhu Mohanty
*Attorney, Agent, or Firm*—Michael H. Minns

[57] ABSTRACT

A steering column assembly having a steering wheel connected to a steering box by upper and lower shafts. A universal joint having a flexible cross member connects the upper and lower shafts.

3 Claims, 2 Drawing Sheets

U.S. Patent  Sep. 3, 1996  Sheet 1 of 2  5,551,919

STEERING COLUMN ASSEMBLY

This is a continuation of applications Ser. No. 07/843,321, filed Feb. 28, 1992, now abandoned and Ser. No. 07/843,792, filed Feb. 26, 1992 now abandoned.

BACKGROUND OF THE INVENTION

This invention relates generally to steering column assemblies and more particularly to universal joints used in steering column assemblies with larger degrees of angular misalignment.

Steering column assemblies are frequently made using two shaft members connected by a rubber coupling. The rubber coupling provides axial and torsional dampening.

As the angular misalignment between the two shaft members increases, the bending stress on the rubber coupling increases. This increases the fatigue on the rubber coupling and reduces its effective lifetime.

The foregoing illustrates limitations known to exist in present steering column assemblies. Thus it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a steering column assembly comprising: a steering wheel connected to an upper shaft member, the upper shaft member being connected to a first yoke; a steering box connected to a lower shaft member, the lower shaft member being connected to a second yoke; and each yoke being pivotally connected to a flexible elastomeric cross member.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
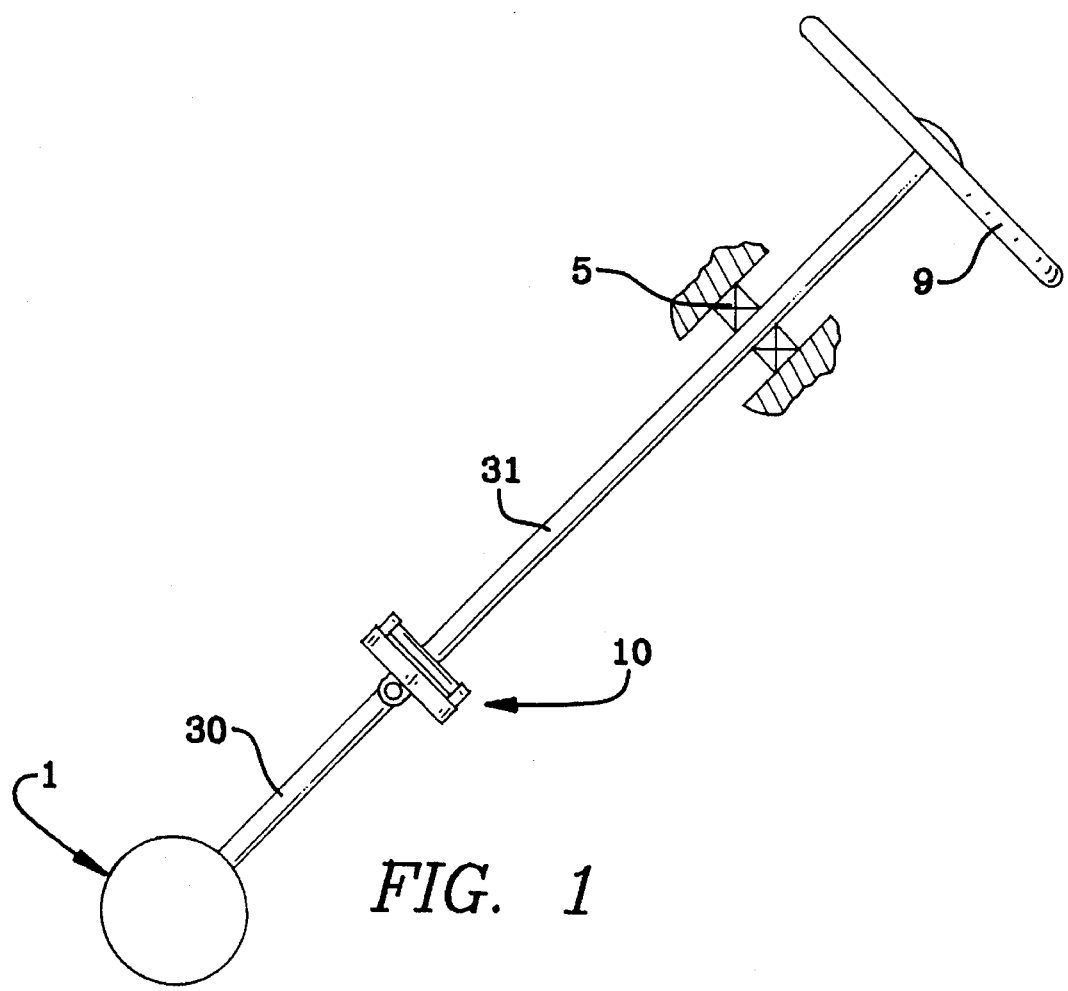
FIG. 1 is a simplified view of a steering column assembly incorporating the present invention.

FIG. 1 shows a steering column assembly comprising an upper shaft 31 and a lower shaft 30. The lower shaft 30 is connected to a steering box 1. A steering wheel 9 is connected to the upper shaft 31. The upper shaft 31 is supported by one or more bearings 5. The upper shaft 31 is connected to the lower shaft 30 of the steering column assembly by a universal joint 10.

Figure 2:
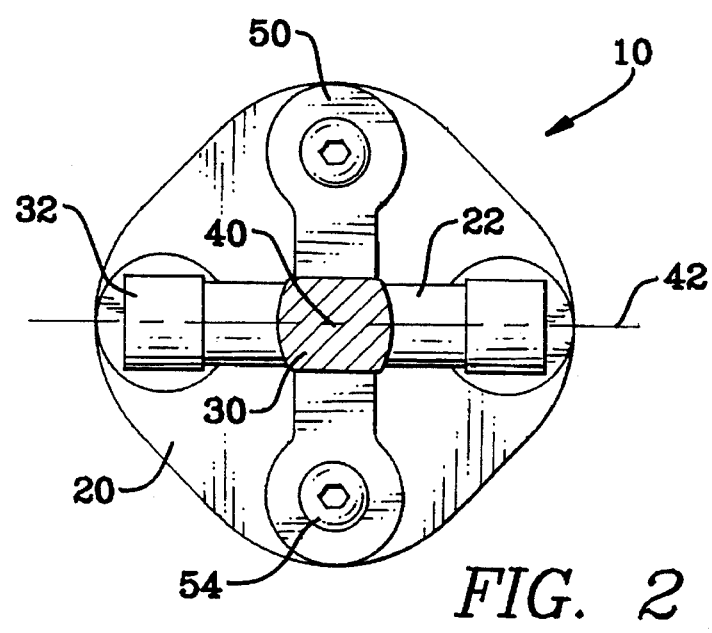
FIG. 2 is a plan view illustrating an embodiment of a universal joint of the present invention.
Figure 3:
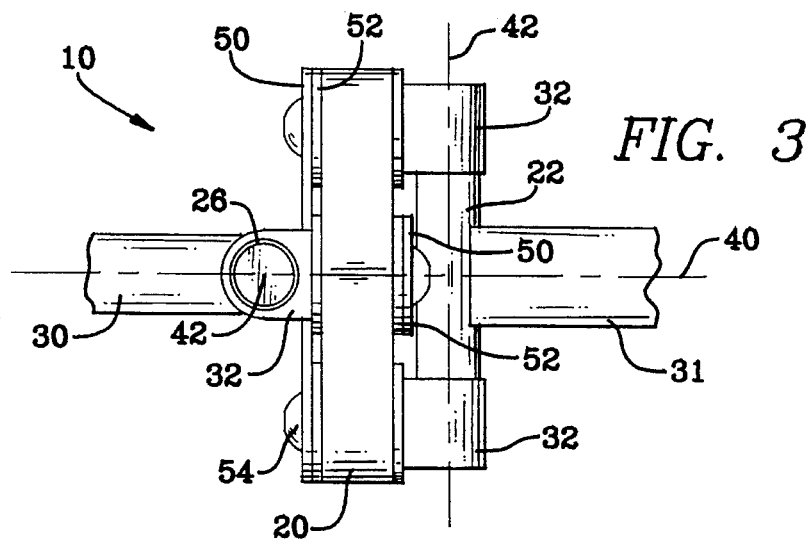
FIG. 3 is a side view of the universal joint shown in FIG. 2.

FIGS. 2 and 3 show a first embodiment of a universal joint 10. The universal joint consists of lower and upper shaft members 30, 31 pivotally connected to a flexible elastomeric cross member 20. The upper shaft member 30 is a driving member and the lower shaft member 31 is the driven member. The universal joint 10 rotates about an axis of rotation 40.

The flexible elastomeric cross member 20 provides axial and torsional dampening between the shaft members 30, 31. The flexible elastomeric cross member 20 also accommodates some angular misalignment between the shaft members 30, 31. Although the flexible elastomeric cross member 20 is shown having a rectangular shape, the cross member 20 can have the more traditional universal joint cross shape.

A pair of supports 32 connect each shaft member 30, 31 to the flexible elastomeric cross member 20. Each support 32 is attached to the flexible elastomeric cross member 20 using screws 54. The screws 54 pass through a dog-bone shaped backing plate 50. Two backing plates 50 are used, one for each shaft member 30, 31. The backing plates 50 prevent the screws 54 from wearing through the flexible elastomeric cross member 20. The flexible elastomeric cross member 20 has raised bosses 52 under each backing plate 50 where the screws 54 attach the backing plate 50 to the flexible elastomeric cross member 20. This raises the backing plates 50 away from the flexible elastomeric cross member 20 and allows some flexing to occur.

Each shaft member 30, 31 terminates in a yoke 22. The ends of each yoke 22 are pivotally connected to the flexible elastomeric cross member 20 by supports 32. As shown in FIG. 3, a bearing 26 is interposed between the yoke end and the support 32. Not all applications of the universal joint 10 require a bearing 26 in the pivotal connection.

Each yoke 22 rotates about an axis of pivot 42. Each axis of pivot 42 is at a 90 degree angle to the axis of rotation 40. Each axis of pivot 42 lies in a plane. One axis of pivot 42 is perpendicular to the other axis of pivot 42. The two planes for the axes of pivots 42 shown in FIGS. 2 and 3 are parallel to each other.

The universal joint 10 is a mechanism for the transfer of torsional movement through an angle with vibrational damping in the axial and torsional directions of the connecting shafts. The kinematics of the universal joint 10 is different than a classical universal joint mainly because of the torsional stiffness of the flexible elastomeric cross member 20 which replaces the rigid cross component. Without the pivotal connections, the flexible elastomeric cross member 20 would undergo large deformations when under torque, thereby changing the 90 degree relative angle between the two yokes and therefor changing the distribution of the load components.

For applications with smaller allowed angular mismatches and with longer connecting shafts, the universal joint 10 described above is suitable. For applications where the misalignment angle is higher and the shafts are short, the rotational center of the universal joint 10 can shift causing an unacceptable increase in run-out. For these applications, the preferred embodiment, described below, is used.

Figure 4:
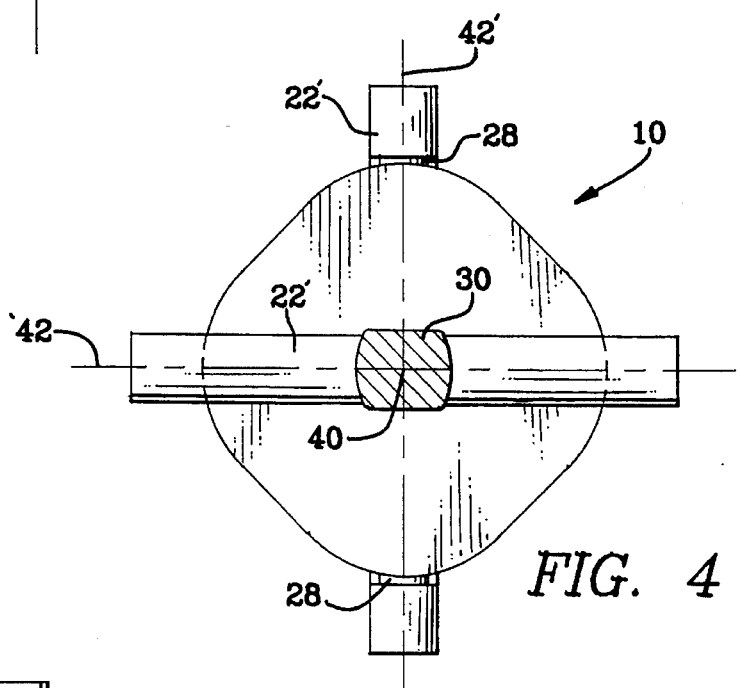
FIG. 4 is a plan view illustrating a second embodiment of a universal joint of the present invention.
Figure 5:
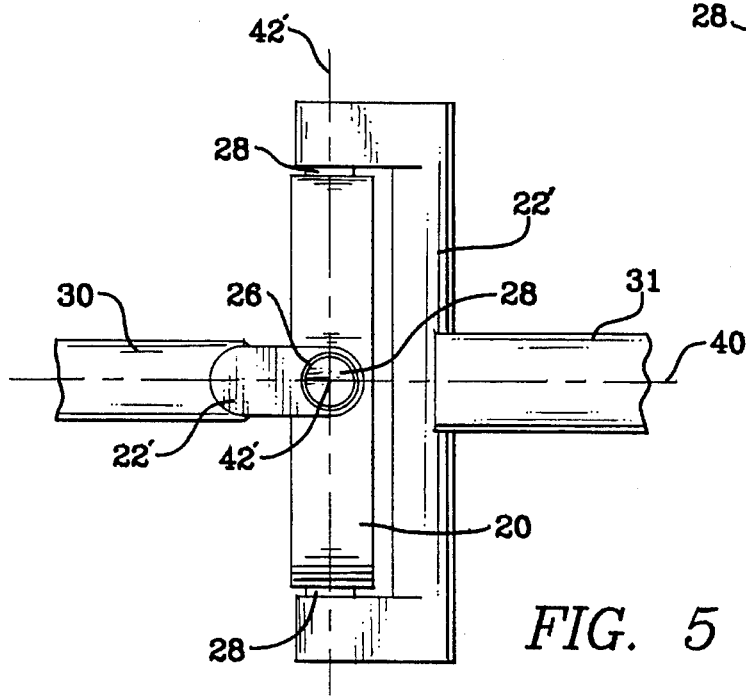
FIG. 5 is a side view of the universal joint shown in FIG. 4.

A preferred embodiment of the universal joint 10 is shown is FIGS. 4 and 5. In the preferred embodiment, two pair of pins 28 are connected to outer edge of the flexible elastomeric cross member 20. Each pin 28 extends outward from the flexible elastomeric cross member 20 at a 90 degree angle to the adjacent pins 28. Each pin is also at a 90 degree angle to the axis of rotation 40. Each shaft member 30, 31 terminates in a yoke 22'. The ends of each yoke 22' are pivotally connected to pins 28. As shown in FIG. 5, a bearing 26 is interposed between the yoke end and the pin 28. Not all applications of the universal joint 10 require a bearing 26 in the pivotal connection.

Each yoke 22' rotates about an axis of pivot 42'. Each axis of pivot 42' is at a 90 degree angle to the axis of rotation 40. The two axes of pivots 42' lie in the same plane.

When the two yokes 22' are pivotally connected to the flexible elastomeric cross member 20 in the same plane, the center of rotation of the universal joint 10 remains in the same point as the angular offset between the shaft members 30, 31 increases. This reduces run-out of the steering column assembly.

Having described the invention, what is claimed is:

1. A steering column assembly comprising:

a steering wheel connected to an upper shaft member having an axis, the upper shaft member being connected to a first yoke;

a steering box connected to a lower shaft member having an axis, the lower shaft member being connected to a second yoke; and one flexible elastomeric disc cross member having a perimeter and disposed in a plane generally perpendicular to the axis of the first and second shaft members, two pairs of pins spaced around the perimeter of the elastomeric disc cross member in one plane, each pin being spaced 90° from adjacent pins and each set of non-adjacent pins acting as pivot points and defining an axis of pivot for, respectively, the first and second yokes so that each yoke is pivotally connected to the flexible elastomeric disc cross member in a plane parallel to the flexible elastomeric disc cross member, the pins and the elastomeric disc cross member being joined together so that any torque applied around the axis of a shaft member is transmitted through the elastomeric member to the pins, wherein the axis of pivot of the first yoke is 90° to the axis of pivot of the second yoke and the axis of pivot of the first yoke intersects the axis of pivot of the second yoke.

2. The steering column assembly according to claim 1, wherein the axis of pivot of the first yoke is located in a first plane; and the axis of pivot of the second yoke is located in a second plane, the first plane being parallel to the second plane and offset from the second plane.

3. The steering column assembly according to claim 1 wherein a bearing is interposed between the yoke and the pins.

* * * * *